(12) United States Patent
Veugen

(10) Patent No.: US 7,869,310 B2
(45) Date of Patent: Jan. 11, 2011

(54) CHECKING A BATCH OF DVD TITLES TO BE ARCHIVED

(75) Inventor: Leonardus Matheus Marie Veugen, Waairs (NL)

(73) Assignee: Koninklijle Philips Electronics N.V., Eindhoven (NL)

( * ) Notice: Subject to any disclaimer, the term of this patent is extended or adjusted under 35 U.S.C. 154(b) by 794 days.

(21) Appl. No.: 11/813,218

(22) PCT Filed: Jan. 9, 2006

(86) PCT No.: PCT/IB2006/050075

§ 371 (c)(1),
(2), (4) Date: Jul. 2, 2007

(87) PCT Pub. No.: WO2006/072922

PCT Pub. Date: Jul. 13, 2006

(65) Prior Publication Data

US 2008/0094945 A1    Apr. 24, 2008

Related U.S. Application Data

(60) Provisional application No. 60/642,682, filed on Jan. 10, 2005.

(51) Int. Cl.
*G11B 7/085*    (2006.01)

(52) U.S. Cl. .................... 369/30.06; 369/47.12; 369/84
(58) Field of Classification Search .............. 369/30.05, 369/30.06, 47.12, 84, 47.1
See application file for complete search history.

(56) References Cited

U.S. PATENT DOCUMENTS

| 5,949,955 A | 9/1999 | Nakai |
| 6,449,226 B1 * | 9/2002 | Kumagai .................... 369/47.1 |
| 6,512,722 B2 * | 1/2003 | Kumagai .................. 369/30.05 |
| 2002/0021890 A1 | 2/2002 | Haino et al. |
| 2002/0064370 A1 | 5/2002 | Berkheimer et al. |
| 2002/0172496 A1 | 11/2002 | Gunji et al. |

FOREIGN PATENT DOCUMENTS

JP    2002290892    10/2002

* cited by examiner

*Primary Examiner*—Ali Neyzari

(57) ABSTRACT

Administrating content of a digital video disc (DVD) having, on-disc, a database involves storing, externally to the DVD, information of the database. Based on the stored information, a check is made as to whether the DVD is operable to accommodate a proposed change to the content. The change on the DVD is made and the on-disc database is correspondingly updated, if the check determines that the DVD is so operable, e.g., if remaining resources of the DVD suffice to make the change. Preferably, the making of the change and the updating on-disc are interactively subject to the user's acceptance by means of a user interface.

23 Claims, 4 Drawing Sheets

CHECKING A BATCH OF DVD TITLES TO BE ARCHIVED

CROSS REFERENCE TO RELATED APPLICATION

This application claims the benefit of U.S. provisional application Ser. No. 60/642,682, filed Jan. 10, 2005, the entire subject matter of which is hereby incorporated by reference.

The present invention relates to administrating the content of a digital video disc (DVD) and, in particular, to checking whether the DVD can accommodate a proposed change to the content, e.g., the addition of one or more recordings.

Several consumer electronics (CE) manufacturers are marketing video recorders that combine a hard disk drive (HDD) with an optical disk drive (ODD), e.g., for a re-writeable DVD. The latter type is typically referred to as an HDD-DVD combination box, or "combi" for short. Such a combi then includes an HDD-based video recorder, also known as personal video recorder (PVR), enhanced with archival capabilities provided by the ODD. This ability to archive to the ODD content of the HDD is likewise typically found in an up-to-date PC, which has a HDD, a CD drive and a DVD drive, preferably with CD- and DVD-burning equipment.

The logical layout of the DVD is subject to several constraints of the emerging DVD Video Recording (DVD_VR) standard. Relevant resources of the DVD are limited as to the number of recordings, the number of chapters, the number of virtual chapters (hereinafter "VR chapters"), the number of cells, the number of sectors and the number of video object units (VOBUs).

A "recording" on the DVD is what is being referred to herein as the result of archiving a title from hard disk to the DVD. The title may be, for example, a movie. Each recording consists of an integral number of chapters. Under the DVD_VR standard, a recording also has an integral number of VR chapters, the latter not necessarily coinciding with the chapters. Each chapter has an integral number of cells, each cell has an integral number of VOBUs, and each VOBU has an integral number of sectors.

Each VOBU is headed by a NavPack which aids in navigating through the DVD, such as when jumping from one scene to another, searching for a specific scene, performing trick-play mode operations such as fast-forward and fast-reverse, and configuring presentation based upon multi-angle viewing, parental control, etc.

The DVD_VR standard does not require any particular handling of the situation when an attempted recording to DVD fails due to lack of resources. One prior art solution is to continue to record without allocating appropriate resources. Another prior art solution is to stop recording once the shortage becomes known. These approaches are less than satisfactory, since, for example, they interfere with navigation and waste disc space.

A commonly-assigned, pending U.S. provisional application, "Dispersive Chapter-Allocation to DVD Recordings," Philips Invention Disclosure 692816, by the same inventor, sets forth one method for gracefully handling the resource shortage to minimize degradation of the final recording.

The present invention brings in additional elements, such as user interaction, to optimally administer the content of the DVD to which recordings are being archived.

In one aspect, a method for administrating content of a digital video disc (DVD) having, on-disc, a database involves storing, externally to the DVD, information of the database. Based on the stored information, a check is made as to whether the DVD is operable to accommodate a proposed change to the content. The method further entails making the change on the DVD and correspondingly updating the on-disc database, if the check determines that the DVD is so operable.

Details of the invention disclosed herein shall be described with the aid of the figures listed below, wherein.

Figure 1:
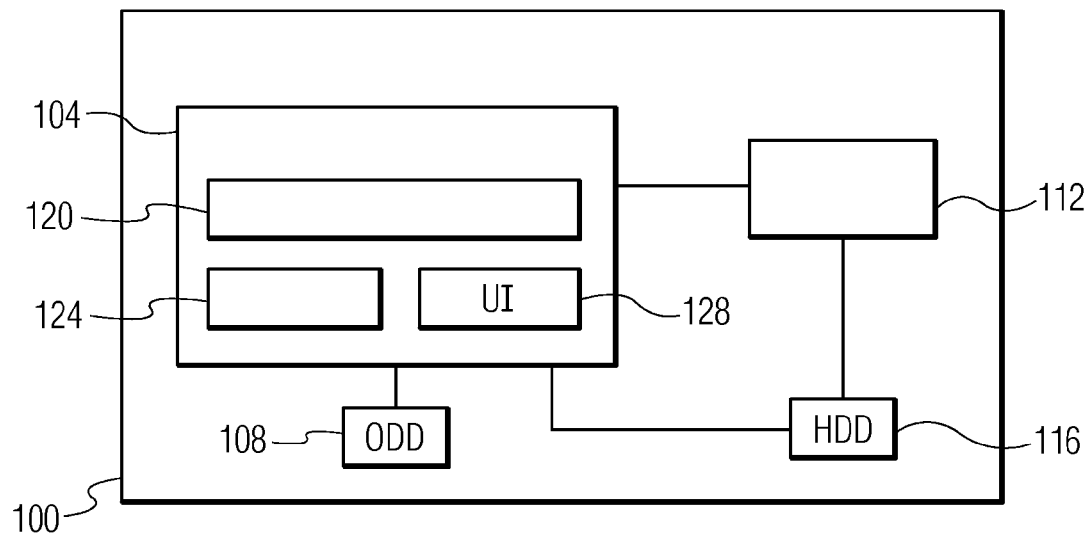
FIG. 1 is a block diagram of a particular user-interactive-archiving HDD-DVD combination box according to the present invention.

FIG. 1 shows an example of a user-interactive-archiving combination box 100 according to the present invention. The box 100 includes a DVD recorder 104 and associated optical disc drive (ODD) 108, and a hard disk recorder 112 and its associated hard disk drive (HDD) 116. The DVD recorder 104 includes a recording processor 120 communicatively linked to a memory 124 and a user interface (UI) 128. The memory 124 typically is comprised of volatile and non-volatile elements, and may include random-access memory (RAM), read-only memory (ROM) and/or any of their variations.

Figure 2:
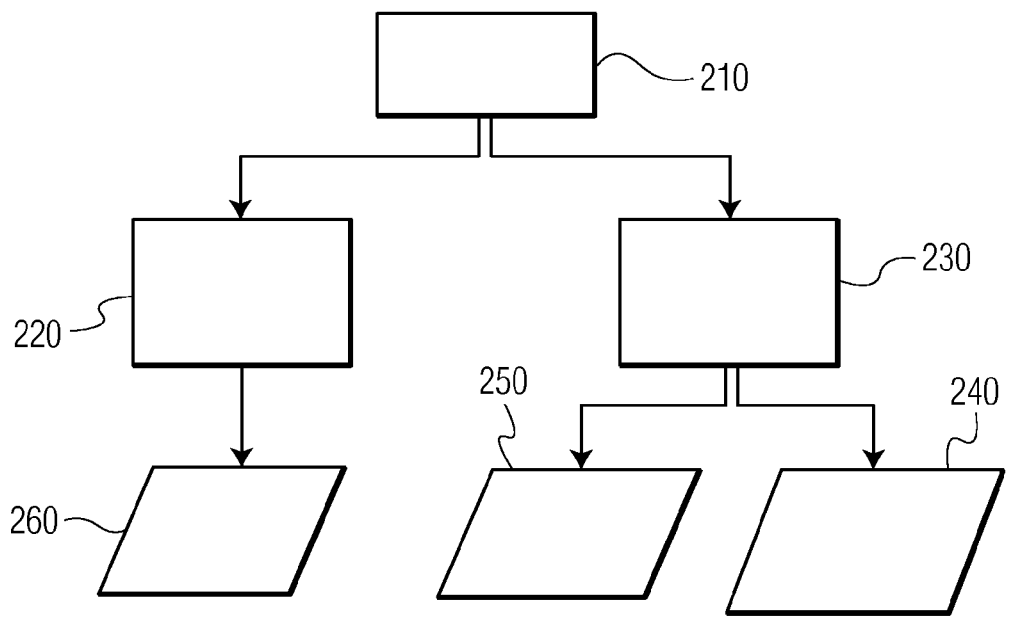
FIG. 2 is a functional diagram relating to the recording processor and memory in FIG. 1.

FIG. 2 illustrates exemplary components of the recording processor 120 and structures stored in the memory 124. These components of the recording processor 120 include a checking application (CA) 210, a hard disk title service (HTS) 220 and an optical disc recording service (ODRS) 230. The structures in memory 124 include a shadow recording database (SRD) 240, and preferably a recording database (RD) 250 and a title database (TD) 260. Although not shown, the memory also stores a copy initially identical to the SRD 240, called the "new SRD" or NSRD. Also, both the ODD 108 and the HDD 116 have their respective on-disc databases, which may, instead of the copies in memory 124, serve as the RD 250 and TD 260, respectively.

The RD 250 contains statistics related to the usage of DVD resources by the recordings stored on the DVD. The ODRS 230 creates the RD 250 in memory 124 by copying the on-disc database of the DVD. If no on-disc database exists, e.g., because the DVD is blank, the empty database is created based on the type of optical disc, e.g., +RW, +R or dual layer +R.

A user operates the UI 128 to control the CA 210. The CA 210, by means of the ODRS 230, retrieves the status of recordings on the DVD. The user also operates the UI 128 to request titles on the HD thereby invoking the HTS 220 to read or retrieve from the TD 260.

Figure 3:
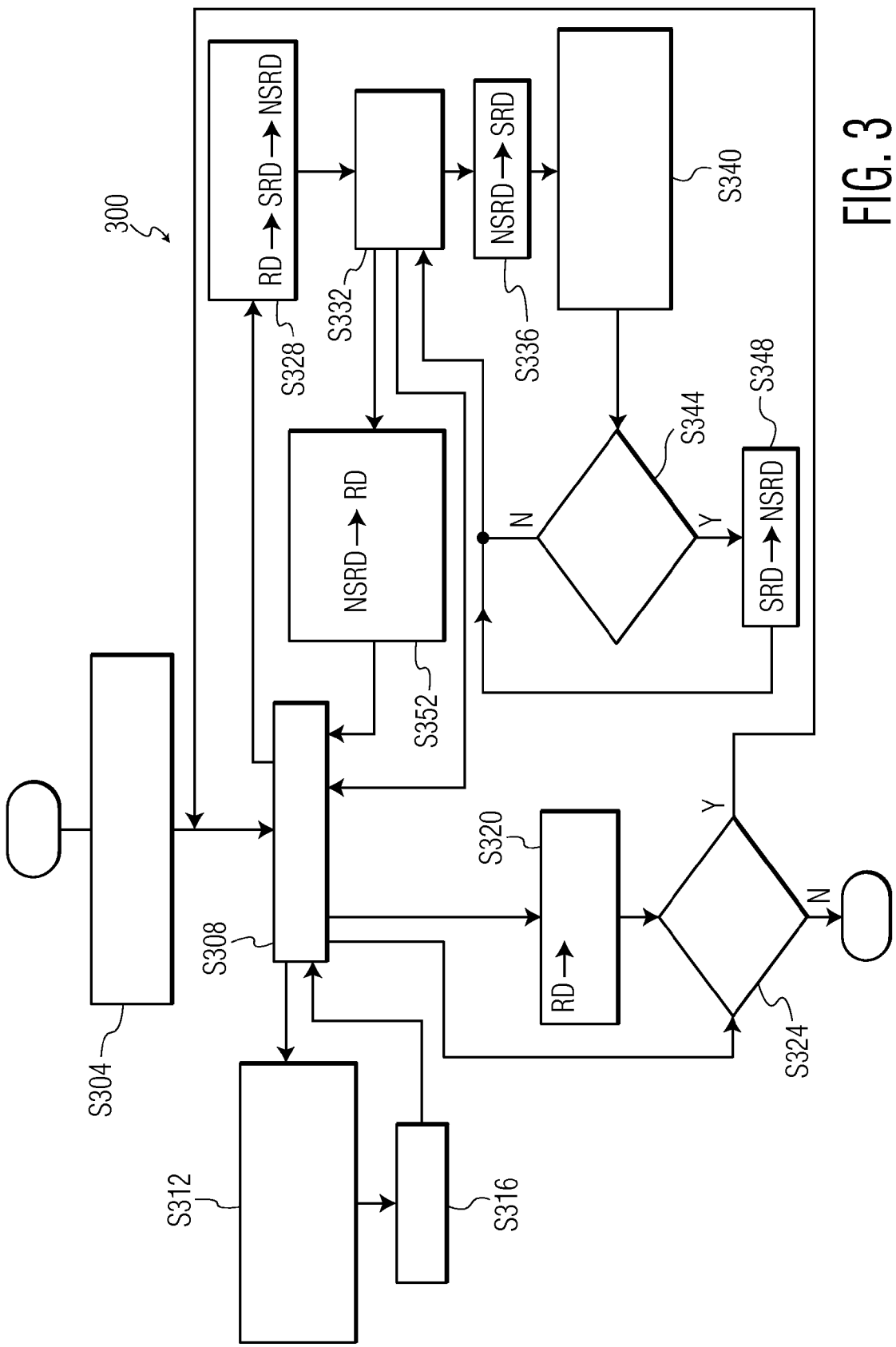
FIG. 3 is a flow chart setting forth an exemplary checking procedure according to the present invention.

FIG. 3 shows, by way of illustrative and non-limitative example, a procedure 300 for checking whether a proposed operation, in archiving from HDD to DVD, obeys predefined constraints relating to resources utilized in effecting logical organization of content on the DVD. First, the on-disc, administrative database is copied to memory 124 to create the RD 250. If the DVD is blank, and therefore lacks an administrative database, the RD 250 is blank (step S304). The user is prompted (step S308), via the UI 128, to select an archiving operation (step S312). An example of an archiving operation is adding a title to be archived or adding a designated set of titles to be archived. In the present development, a title on HD corresponds to the "recording" on the DVD that results from archiving that title. The proposed archiving operation is then executed, and the RD 250 is correspondingly updated (step S316). Execution is in active mode, meaning that the archiving operation is actually performed from the HD to the DVD. In general, the user is then prompted to determine if another archiving operation is desired (step S308).

If the user indicates another operation, and utilization of a resource is sufficiently close to its limit due to the just-executed archiving operation, the user is notified of this and that any archiving operation will be pre-checked based on the remaining DVD resources. If, on the other hand, resource utilization is determined not to be sufficiently close to respective limits, control returns to step S312 for another archiving operation. On the other hand, if the user indicates that no further archiving is desired, and an update of the RD 250 has been made (step S316), the on-disc database is now updated from the RD 250 (step S320). This update brings the on-disc database into conformity with its content, the latter having been changed due to archiving. The user is now prompted as to whether archiving is complete (step S324). If archiving is to continue, control returns to step S308, and the user is prompted accordingly. If, however, no update has been performed on the RD 250, as when the user is interested merely in checking proposed archiving operations which is explained further below, control branches directly to step S324.

In the case where it is determined that utilization of a resource is sufficiently close to a limit, and the user has indicated a desire to continue archiving, the checking procedure is initiated. The user proceeds directly to the checking procedure, and update of the on-disc database is postponed to avoid wasting time and possibly sectors on a DVD+R disc. First, both the SRD 240 and NSRD are updated from the RD 250 (step S328). The user is prompted to select an archiving operation, this time in checking mode (step S332). In checking mode, the actual archiving operation to DVD is deferred subject to checking whether it is allowed, and whether the user, having been notified the operation is allowed, chooses to perform it. Thus, if the user does not want to accept an archiving operation, though allowed by the CA 210, the user can exit the checking procedure by a branch back to step S308. Once the user selects an archiving operation, the SRD 240 is updated from the NSRD (steps S336, S340), and a checking process determines whether the selected operation causes a resource constraint to be exceeded (step S344). This check is performed by executing the proposed archiving operation against the SRD 240. If it is determined that the operation is allowed, the archiving operation is queued in memory 124 for future execution on the DVD, and the NSRD is updated from the SRD 250 (step S348). In any event, the user is notified as to whether the operation is allowed, and prompted as to whether the user wishes to continue with the checking procedure (step S332).

If the user wants to exit the checking procedure, control proceeds to step S308, and none of the checked operations are performed. Accordingly, the user can utilize the checking procedure to merely check archiving operations without having to perform them. If, on the other hand, the user wants to continue with the checking procedure, the user is prompted as to whether the user wants to perform another archiving operation (step S332). If the user wants to perform another archiving operation, that archiving operation is performed (steps S336, S340, S344); otherwise, if there is to be no further archiving, the RD 250 is updated from the NSRD, and the queue of archiving operations is executed on the DVD (step S352). The user is then prompted as to whether the user wants to do any further archiving (step S308). If there is further archiving, control returns to step S328. If, however, no further archiving is indicated, the on-disc database is updated from the RD 250 (step S320), and archiving is complete.

Figure 4:
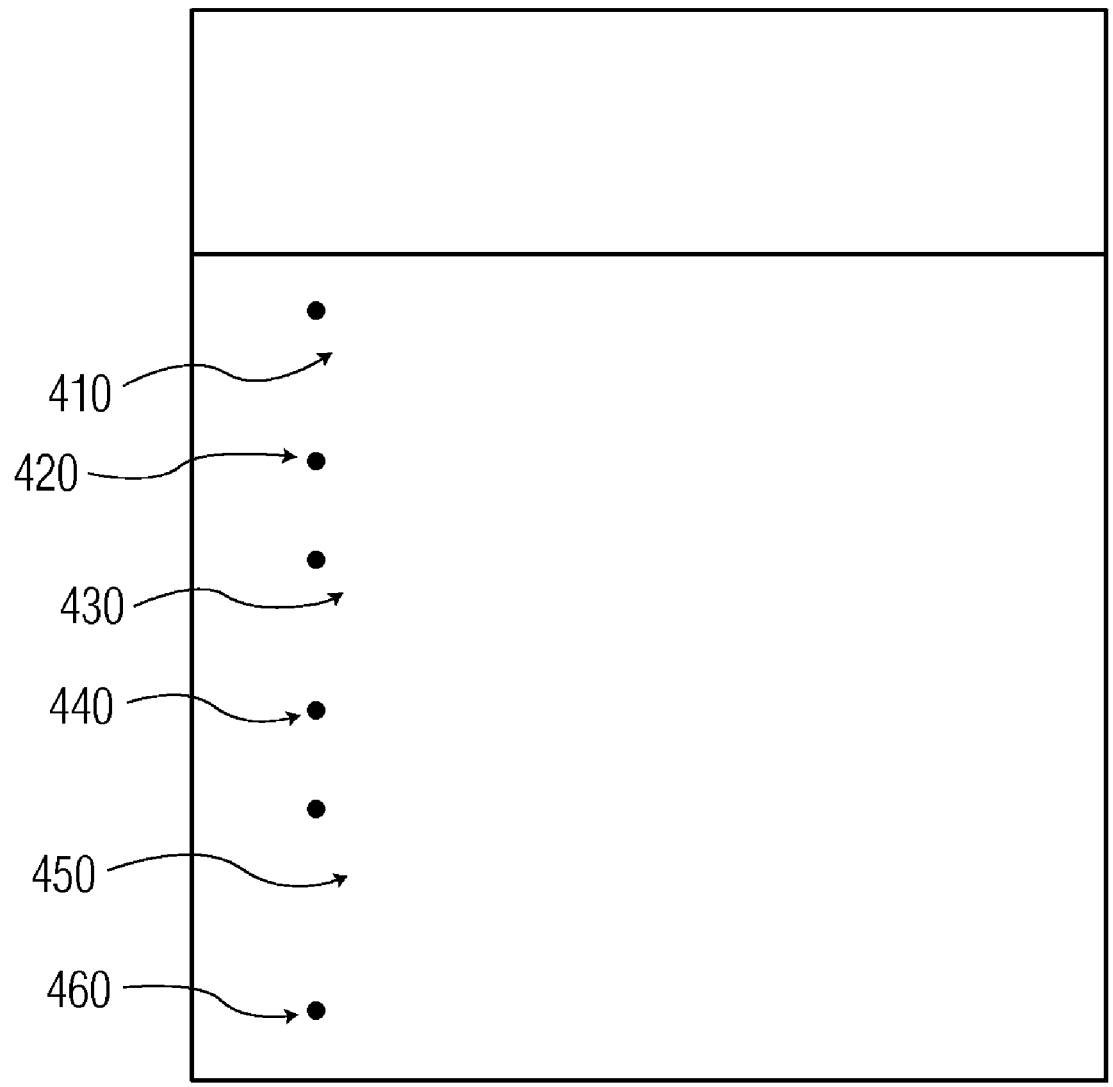
FIG. 4 is a listing of examples of operations that can be invoked by the user in performing a checking process within the checking procedure in FIG. 3, according to the present invention.

Listed in FIG. 4 are examples of DVD operations the user can select by means of the UI 128. The operation "add a title" 410 discussed above can be invoked by the user to add a title or a designated group of titles. The adding may be performed, for instance, by manipulating a light pen to select one or more titles from a menu the CA 210 forms via feedback from the HTS 220.

Adding a title may be enabled to overwrite an existing recording on the DVD. Thus, for example, the checking process, in step S344, may discover that number of disc sectors (each 2 kilobytes) between the last recording, or added title, and the end of the DVD recordable medium cannot accommodate the title to be added. However, the checking process may be implemented, or be set in a mode, for overwriting the oldest recording. According to the particular design, the user may or may not be involved, by means of the UI 128, in selecting a portion of the DVD for overwriting.

When overwriting is enabled for a particular embodiment of the invention, the checking process preferably maintains not only a count of reserved resources, but the actual location(s) on DVD where available resources may be expended. Executing the archiving operation on the SRD 240, as in step S344, automatically maintains this information.

If, on the other hand, overwriting is not enabled, the checking process S344 can be reduced, for simplicity, to maintaining resource counts for comparison to respective thresholds. In such an embodiment, checking need not be performed on a database; instead, checking is performed by making comparisons against resource constraints. Once the checking is accepted by the user, the queue of archiving operations can be executed against the RD 250 in step S352. Accordingly, the SRD 240 and NSRD can be eliminated. Notably, if, for example, titles are added for checking (step S340), and the user decides not to make any updates to DVD based on the checking (step S332), step S352 can be bypassed so that control returns to step S308. At this point, any user archiving prior to the checking (step S316), and any prior checked operations that were consummated to DVD and executed on the RD 250 (step S352 re-designed for this embodiment), are reflected in the updated RD. If the RD 250 has been updated, control branches to step S320; otherwise, control branches to step S324.

Overwriting can also, or alternatively, be enabled/disabled with respect to a title, as opposed to a recording. Thus, if insufficient room exists on the DVD medium due to an added title or titles, the "add a title" operation may overwrite, fully or partially, the previously added title or titles. This would, wholly or partially, release the DVD resources reserved for those added titles.

The operation "remove an added title" 420 removes a title that has been added in the checking procedure 300 but not yet recorded to DVD. If the operation is invoked just after the respective adding operation, or if overwriting is not enabled, the removing simply undoes the adding. Otherwise, intervening operations may preclude merely undoing the respective adding of the title. For example, removing a title may allow the CA 210 to undo the overwriting of a recording that was permitted based upon a then-perceived shortage of resources.

To make room for archiving, the user may "delete a recording" 430. The "delete a recording" operation releases the resources reserved by that recording.

The "restore a deleted recording" operation 440 undoes the "delete a recording" operation 430 in an analogous manner as that described above with regard to the "add a title" 410 and "remove an added title" 420 pair of operations.

"Lock a recording" 450 prevents the recording from being deleted, thereby preventing any resources reserved for the recording from being taken away.

"Unlock a recording" 460 undoes the "lock a recording" operation 450 in the analogous manner described above for the other operation pairs.

Figure 5:
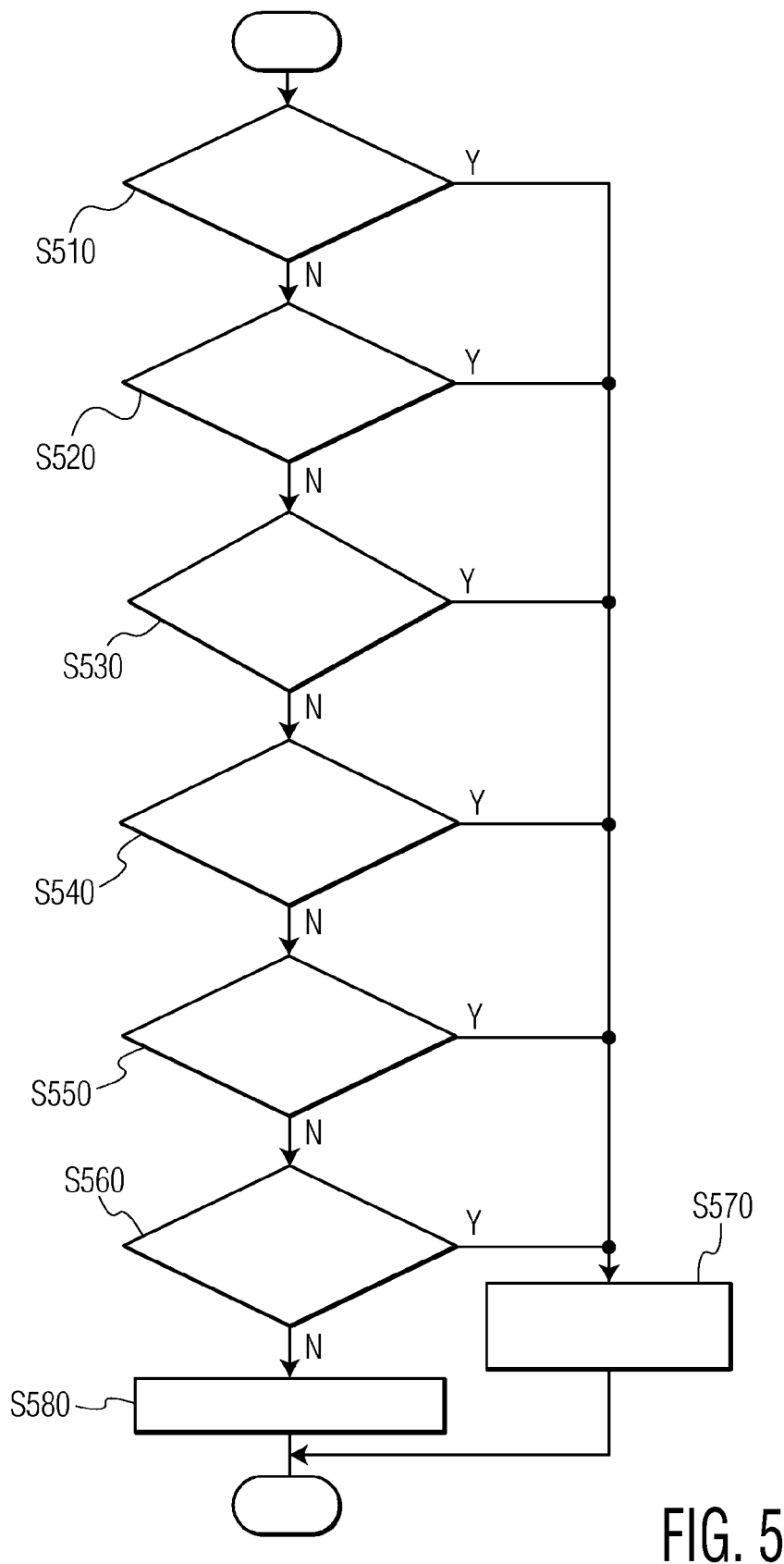
FIG. 5 is a flow chart showing one example of processing by the DVD recording processor during the checking process.

FIG. 5 shows an exemplary algorithm for step S340 of the checking process in FIG. 3. If the count of the particular resource reserved by the combination of existing recordings and added titles exceeds the respective threshold, the proposed operation cannot be performed (steps 510-570); otherwise, the operation can be performed (step S580).

While there have been shown and described what are considered to be preferred embodiments of the invention, it will, of course, be understood that various modifications and changes in form or detail could readily be made without departing from the spirit of the invention. For example, the CA 210 may be implemented to forego notifying the user when utilization of a resource is sufficiently close to a respective limit. Instead, the user may rely on a display of resource utilization and accompanying limits and title statistics to independently determine when to enter the checking procedure. It is therefore intended that the invention be not limited to the exact forms described and illustrated, but should be constructed to cover all modifications that may fall within the scope of the appended claims.

What is claimed is:

1. A method for administrating content of a digital video disc (DVD) having, on-disc, a database, said method comprising:

storing, externally to the DVD, information of said database;

checking, based on the stored information, whether the DVD is operable to accommodate a proposed change to said content; and, if the checking determines that the DVD is so operable, making said change on the DVD and correspondingly updating the on-disc database.

2. The method of claim 1, further comprising indicating, by a user, whether the change is accepted, said making and updating being subject to the acceptance.

3. The method of claim 1, further comprising creating, externally to the DVD, a database for administrating said content, wherein said storing is of the created database, and said checking is from the created database.

4. The method of claim 3, wherein determining whether the DVD is so operable involves modifying the created database to reflect said proposed change, said updating copying the modified database to the DVD.

5. The method of claim 4, further comprising making, prior to said modifying, a copy of said created database to be modified and updating said copy when said checking determines that the DVD is so operable.

6. The method of claim 5, said method further comprising copying said copy to the DVD to bring said database on the DVD into conformity with said content of the DVD.

7. The method of claim 3, wherein said method is iteratively executed, and said updating is selectively postponed in a current iteration to a subsequent iteration.

8. The method of claim 1, wherein said checking comprises comparing, to respective maximum thresholds, at least two statistics representative of resources of the DVD currently being reserved for said content.

9. The method of claim 1, further comprising interactively designating, by a user, said proposed change.

10. The method of claim 9, wherein the postponement of the updating occurs when a user interactively indicates an intention to make further change to said content.

11. A digital video disc (DVD) recorder for administrating content of a DVD having, on-disc, a database, said recorder comprising:

a memory external to the DVD for storing information of said database; and a recording processor configured for checking, based on the stored information, whether the DVD is operable to accommodate a proposed change to said content, and, if the checking determines that the DVD is so operable, making said change on the DVD and correspondingly updating the on-disc database.

12. The recorder of claim 11, further configured such that said making and updating are subject to user acceptance of the change.

13. The recorder of claim 11, wherein the stored information comprises a database created in said memory for administrating said content, and said checking is from the created database.

14. The DVD recorder of claim 13, wherein determining whether the DVD is so operable involves modifying the created database to reflect said proposed change, said updating copying the modified database to the DVD.

15. The DVD recorder of claim 14, further configured for making, prior to said modifying, a copy of said created database to be modified and updating said copy when said checking determines that the DVD is so operable.

16. The DVD recorder of claim 15, further configured for copying said copy to the DVD to bring said database on the DVD into conformity with said content of the DVD.

17. The DVD recorder of claim 11, further configured such that said checking comprises comparing, to respective maximum thresholds, at least two statistics representative of resources of the DVD currently being reserved for said content.

18. The DVD recorder of claim 11, further comprising a user interface for interactively designating, by a user, said proposed change.

19. The DVD recorder of claim 11, further including a user interface and further configured to postpone said updating of said on-disc database when a user interactively indicates, by means of the interface, an intention to make further change to said content.

20. A hard disk drive/digital video disc (HDD-DVD) combination box comprising the recorder of claim.

21. The DVD recorder of claim 11, wherein said proposed change comprises at least one user selection from among of plurality of operations performable on the DVD, at least one of the plural operations being enabled to overwrite a recording that exists on the DVD and is listed in a table of contents that resides on the DVD.

22. A tangible apparatus with variations of a physical property that interact with a digital video disc (DVD) recorder to control a processor of the DVD recorder to perform a method comprising:

creating, external to a DVD, a database for administrating content of the DVD;

checking the database to determine whether the DVD is operable to accommodate a proposed change to said content; and if the checking determines that the DVD is so operable, making said change on the DVD and correspondingly updating a database on the DVD for administrating said content.

23. A tangible apparatus with variations of a physical property that interact with processing apparatus to control a processor to perform a method comprising:

checking a database on a digital video disc (DVD) to determine whether the DVD is operable to accommodate a proposed change to said content, the database comprising information for administrating the content of the DVD; and if the checking determines that the DVD is so operable, making said change on the DVD and correspondingly updating the administration database on the DVD.

* * * * *